United States Patent [19]  
Price et al.

[11] Patent Number: 4,505,063  
[45] Date of Patent: Mar. 19, 1985

[54] NIGHT FISHING SIGNAL

[76] Inventors: Donald L. Price, 516 E. Roberts; Van A. Nechvatal, 2631 E. Fremont, both of Fresno, Calif. 93710

[21] Appl. No.: 490,193

[22] Filed: Apr. 29, 1983

[51] Int. Cl.³ .............................................. A01K 87/02
[52] U.S. Cl. ........................................... 43/17; 43/17.5
[58] Field of Search ........................ 43/17, 17.5, 17.6; 252/700; 362/34

[56] References Cited

U.S. PATENT DOCUMENTS

| 2,770,907 | 11/1956 | Sharer | 43/17 |
| 3,148,473 | 9/1964 | Miller | 43/17 |
| 3,576,987 | 5/1971 | Voight | 43/17.6 |
| 3,578,962 | 7/1969 | Gerber | 252/700 |
| 3,918,190 | 11/1975 | Hornbeck | 43/17.6 |

FOREIGN PATENT DOCUMENTS 1509331 5/1978 United Kingdom ............... 43/17

Primary Examiner—Nicholas P. Godici  
Assistant Examiner—C. McKee  
Attorney, Agent, or Firm—Huebner & Worrel

[57] ABSTRACT

A night fishing signal for use with a fishing pole having a fishing disposition, the signal having a flexible, light transmitting outer container which has a bulbous end portion and is provided with a first chemiluminescent reactant; a second, breakable container disposed within the outer container and provided with a second chemiluminescent reactant which forms a chemiluminescent liquid on contact with the first reactant; and a clip fixed to the outer container for mounting the signal on the pole with the bulbous portion downwardly disposed so that, upon breaking the inner container by flexing the outer container, the liquid collects in the bulbous portion visually to signal movement of the pole when a fish is hooked on the line.

3 Claims, 4 Drawing Figures

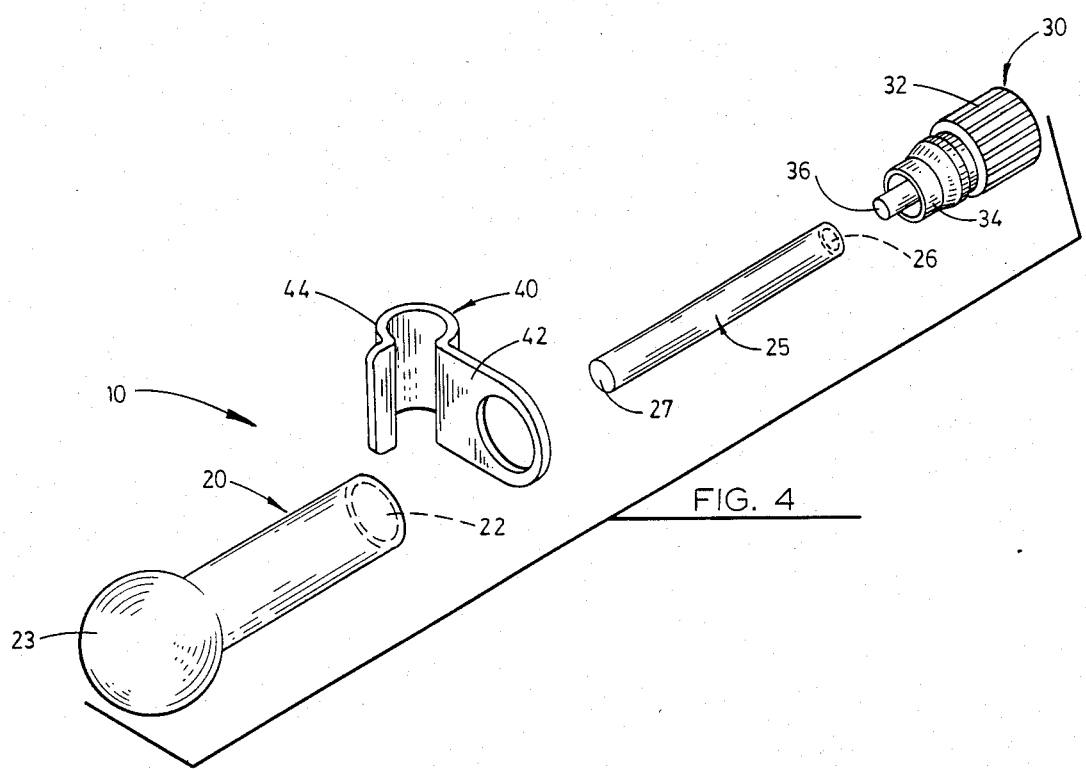
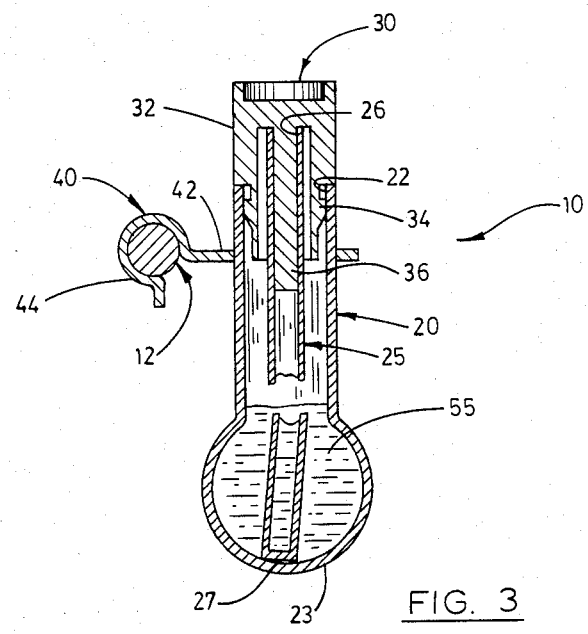

NIGHT FISHING SIGNAL

BACKGROUND OF THE INVENTION

1. Field of the Invention

The present invention relates to a night fishing signal and more specifically to such a signal mountable on a fishing pole and emitting light by chemiluminescence so that movements of the pole when a fish is hooked are visually signalled.

2. Description of the Prior Art

It is known to mount on a fishing pole electrical battery powered devices which emit visible and/or audible signals when the pole moves. Although effective as signal emitters, these devices are relatively heavy so as to affect the natural characteristics of the pole, are complex and thus expensive, and are rendered inoperative by battery failure. It is also known to provide chemiluminescent light by a device having an outer flexible and transparent container having one reactive composition and an inner breakable container for another reactive composition, the compositions being brought into contact to emit light by bending the outer container to break the inner container.

INFORMATIONAL DISCLOSURE STATEMENT

The following patent, a copy of which is enclosed together with Form PTO-1449, is submitted in conformance with 37 C.F.R. §1.97 and §1.98 and characterizes, together with the prior art discussed above, the closest prior art of which the applicants are aware:
Voight et al. U.S. Pat. No. 3,576,987 May 4, 1971

This patent is believed relevant in its disclosure of a device which provides chemiluminescent light and has the general construction described above. The device of the Voight et al. patent has an outer tube which is cylindrical for its entire length and has an inner tube which is substantially coextensive with the outer tube and has ends which are fixed relative to the ends of the outer tube.

SUMMARY OF THE INVENTION

It is an object of the present invention to provide an improved night fishing signal.

Another object is to provide such a signal which clearly indicates movement of a fishing pole when a fish is hooked by a lure connected to a line thereon and is fully effective when used by those with impaired hearing.

Another object is to provide such a signal which is light in weight and compact and does not significantly affect the natural handling characteristics of the pole.

Another object is to provide such a signal which is easily mounted and dismounted from fishing poles having a wide variety of constructions.

Another object is to provide such a signal wherein light is provided by chemiluminescent reactants disposed in a compact configuration.

A further object is to provide such a signal having the above and other advantages and which is storable for an extended period before use, economical, rugged, not subject to corrosion, convenient to use, and fully effective in performing its intended purposes.

BRIEF DESCRIPTION OF THE DRAWING

FIG. 3 is a sectional view of the signal taken from the position of line 3—3 of FIG. 2 with an inner container of the signal in a broken condition.

FIG. 4 is a view of the signal with elements thereof separated, as for filling, and the inner container unbroken.

DESCRIPTION OF THE PREFERRED EMBODIMENT

Figure 1:
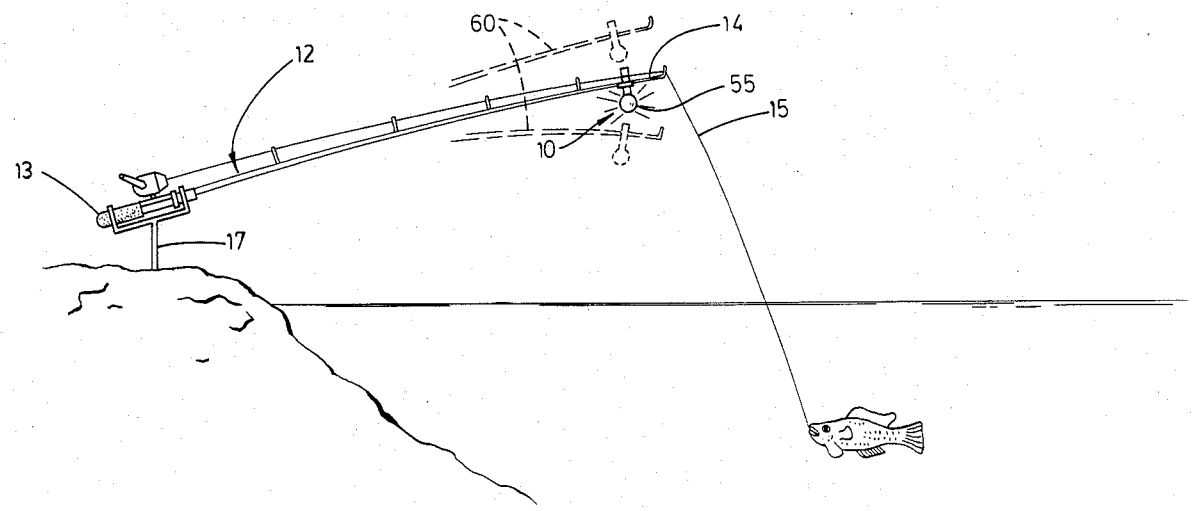
FIG. 1 is a side elevation of a fishing signal which embodies the principles of the subject invention and is depicted in a representative operating environment.

Referring with greater particularity to the drawings, the figures depict a night fishing signal 10 which embodies the principles of the subject invention. The signal is depicted in FIG. 1 in a representative operating environment which includes water, an adjacent land such as a stream bank, and a fish. The signal is used with a fishing pole 12 which is elongated, flexible and resilient. The pole is provided with a handle 13 and has a distal portion 14 from which a fishing line 15 extends. The pole is of any construction such that its distal portion vibrates or oscillates when a fish is hooked on the line. The pole is depicted as being emplaced on the bank in a fishing disposition, in which the pole extends generally horizontally supported by a holder 17. The holder is of any suitable construction to retain the pole in such disposition without attention of a fisherman until a fish has been hooked on the line.

Figure 2:
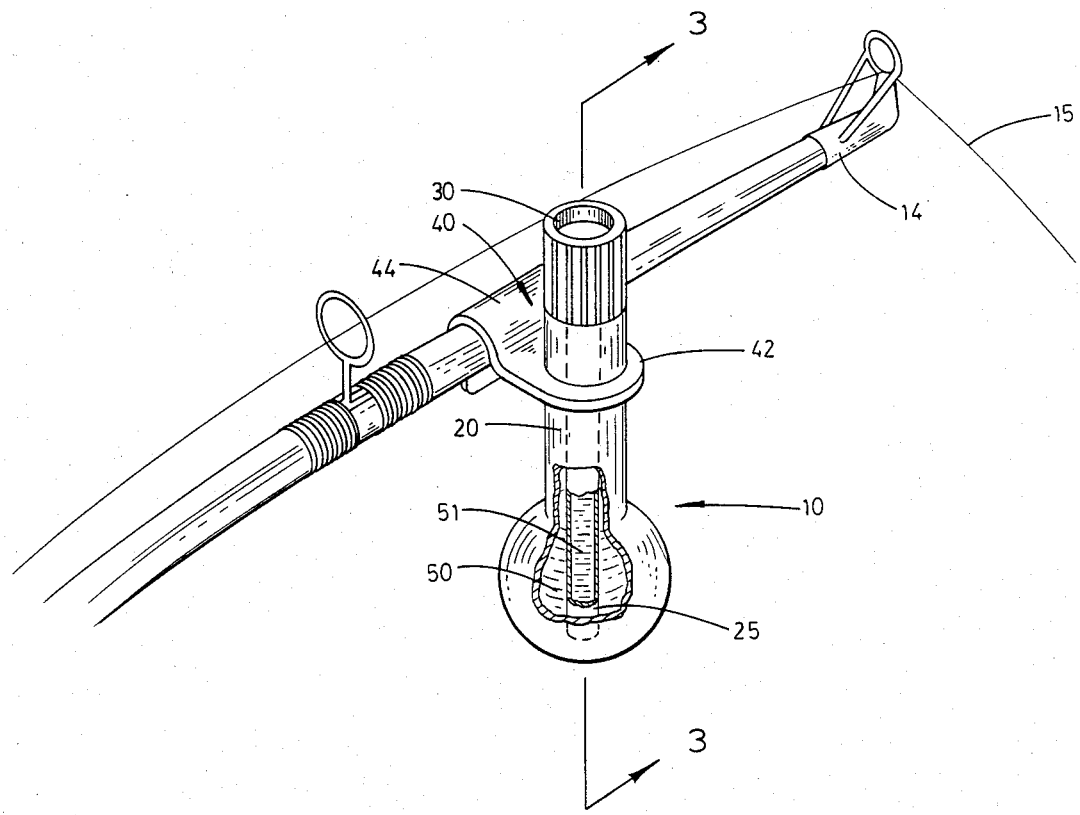
FIG. 2 is a perspective view of the signal of FIG. 1 at an enlarged scale mounted on a fragmentarily represented fishing pole, portions of the signal being depicted as broken away to show reactants therein.

As is apparent from FIGS. 2, 3, and 4 the signal 10 has an outer container 20 which is of generally tubular configuration. This container has an open end 22 and has an opposite, closed end portion 23 which is spherical and bulbous, the balance of the container being cylindrical. The outer container is constructed of any suitable material, typically a plastic material, which is flexible, somewhat resilient, and transmits light. The signal has a breakable inner container 25 which is receivable within the outer container and is constructed of any suitable material such as thin glass or brittle plastic material. The inner container has an open end 26 and an opposite closed end 27. The inner container is a cylindrical tube having an outer diameter which is substantially less than the inner diameter of the cylindrical part of the outer container and which is somewhat shorter axially than the over-all interior length of the outer container.

The signal 10 has a plug 30 which, typically, is unitarily constructed of somewhat resilient material and has a solid cylindrical body 32 generally equal in diameter to the exterior of the outer container 20. The plug has a hollow cylindrical skirt 34 which is concentric with the body and extends axially therefrom. The outer diameter of the skirt is closely and slidably fitted to the interior of the open end 22 of the outer container so that the skirt is a portion of the plug receivable in fluid-tight relation in such open end. The plug has a cylindrical stem 36 extended from the body concentrically within the skirt. The outer diameter of the stem is such that it is closely and slidably fitted to the interior of the inner container. It is evident that the stem is a portion of the plug disposed centrally of the skirt and receivable in fluid-tight relation on the open end of the inner container. It is apparent that, when the skirt and the plug are each received on the corresponding open container end and when the containers are disposed with their open ends in engagement with the body, the plug supports the inner container within the outer container, the inner container then being mounted by the plug within the outer container and the plug serving to close the containers in fluid-tight relation.

The signal 10 has a clip 40 which is mounted on the outer container 20 adjacent to the open end 22 thereof. The clip, typically, is constructed of resilient plastic material and has a planar portion 42 which is fixed to the outer container in any suitable manner. This planar portion circumscribes the outer container and is substantially normal to the axis thereof. Such axis is a line extending between the open end of the outer container and the opposite end thereof. The clip has a recurved portion 44 which extends from the planar portion and is curved therefrom toward the bulbous portion 23 of the outer container about a line lying in a plane normal to such axis. The opening defined by the recurved portion has a width such that, when the distal portion 14 of the pole 12 is received in the recurved portion and extended longitudinally along such line about which the recurved portion is curved, the recurved clip portion releasably clamps the signal onto the pole at the distal portion thereof. The clip is thus extended from the outer container and serves to fix this container to the pole for movement with the distal portion thereof. It is apparent from FIGS. 1 and 2 that the clip is configured to mount the outer container on the pole with the bulbous portion 23 disposed downwardly of the open end 22 when the pole is in the fishing disposition and the pole is extended longitudinally through the recurved portion of the clip. It is apparent that the resilient clip serves to mount the signal on a fishing pole which has a distal portion within a relatively wide range of dimensions and proportions.

The signal 10 has, as shown in FIG. 2, a first chemiluminescent reactant 50 which is received within the outer container 20 and, initially, is isolated by the inner container 25 from a second chemiluminescent reactant 51 of the signal, the latter reactant initially being received in the inner container 25. These reactants are any suitable compounds or compositions which are storable without light production so long as not in contact but which are liquid and produce chemiluminescent light when brought into contact. The signal may thus be stored for an extended period prior to use so long as the inner container is unbroken. Suitable reactants are disclosed in U.S. Pat. No. 3,597,362 to Bollyky et al and in the above noted U.S. Pat. No. 3,576,987 to Voight et al. The quantity of each reactant is such that, after contact, the volume of the reactants is substantially equal to that of the bulbous portion 23 of the outer container. The containers, the plug 30, and clip 40 are configured for economical construction of plastic material so that, when so constructed, the signal is not subject to corrosion during storage.

OPERATION

The operation of the described embodiment of the subject invention is believed clearly apparent and is briefly described at this point. The signal 10 is mounted by its clip 40 on the pole 12 in the manner set forth above and the pole emplaced in the fishing disposition, as shown in FIG. 1, with the bulbous portion 23 of the outer container 20 downward of the plug 30. Initially the reactants 50 and 51 are separated by the unbroken inner container 25. However, at any convenient time immediately prior to, during, or after mounting the clip on the pole and emplacing the pole, the outer container is flexed, as with the fingers, sufficiently to engage and to break the inner container so that, as shown in FIG. 3, the inner container is opened centrally between its ends 26 and 27 and the reactants are brought into contact. It is evident that such breakage is facilitated by the tubular configuration of the inner container and of the portion of the outer container adjacent to the open end 22 thereof. After contact the reactants mix and, being liquid, flow gravitationally into the spherical and bulbous outer container portion 23 where, as indicated by the numeral 55 in FIGS. 1 and 2, the mixed reactants are received and produce light by chemiluminescence. This light is concentrated by its production from the generally spherical source provided by the mixed reactants which are in a compact configuration when received in such spherical portion.

So long as a fish is not hooked on the line 15, the distal portion 14 of the pole 12 and the signal 10 remain substantially stationary indicating that no attention is required. However, when a fish is hooked on the line the distal pole portion vibrates or oscillates and moves the signal with an attention attracting waving action, as indicated by the numeral 60 in FIG. 1, so that light produced by the mixed reactants 55 in the bulbous portion 23 is observable at night to signal the waving of the pole and the presence of a hooked fish on the line.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A night fishing signal for use with a fishing pole and comprising:
    A. a generally tubular outer container for a first chemiluminescent reactant, such container being constructed of flexible, light transmitting material and having an open end and an opposite end;
    B. a generally tubular inner container for a second chemiluminescent reactant, such inner container having an open end and an opposite end and being receivable within the outer container and being constructed so as to open between such ends when the inner container is received in the outer container and the outer container is flexed to engage the inner container;
    C. a plug having a first portion receivable in fluid-tight relation on the open end of the outer container and a second portion disposed centrally of such first portion and receivable in fluid-tight relation on the open end of the inner container with the plug supporting the inner container within the outer container when such portions of the plug are received on the corresponding open ends of the containers; and
    D. a clip having one portion fixedly connected to the outer container and having a recurved portion of resilient material configured detachably to clamp on the pole when the pole is received in such recurved portion.

2. The signal of claim 1 further comprising such a first chemiluminescent reactant received in the outer container and such a second chemiluminescent reactant received in the inner container so that such reactants are brought into contact to produce light when the outer container is flexed sufficiently to open the inner container.

3. The signal of claim 1 wherein the signal is usable with a fishing pole having a fishing disposition in which the pole extends generally horizontally; wherein the clip is disposed adjacent to the open end of the outer container and such recurved portion is curved about a first line lying in a plane generally normal to a second line between the open end of the outer container and the opposite end thereof so that the outer container is mountable on the pole with such opposite end portion downwardly of the open end when the pole is in such fishing disposition and the pole is extended longitudinally through such recurved portion; wherein the reactants are liquid subsequent to being brought into contact; and wherein said opposite end portion is bulbous so as to receive the contacted reactants and concentrate the light provided thereby when the outer tube is so mounted and the pole is in such fishing disposition and when the reactants are so mixed in the outer container.

* * * * *